(12) United States Patent
Biere et al.

(10) Patent No.: US 6,698,059 B2
(45) Date of Patent: Mar. 2, 2004

(54) INTAKE SYSTEM FOR CENTRAL VACUUM CLEANER

(75) Inventors: Darin J. Biere, Webster City, IA (US); Jason L. Werning, Ellsworth, IA (US)

(73) Assignee: White Consolidated Industries, Inc., Cleveland, OH (US)

( * ) Notice: Subject to any disclaimer, the term of this patent is extended or adjusted under 35 U.S.C. 154(b) by 164 days.

(21) Appl. No.: 10/014,714

(22) Filed: Dec. 11, 2001

(65) Prior Publication Data

US 2003/0132634 A1 Jul. 17, 2003

(51) Int. Cl.[7] ................................................. A47L 5/38
(52) U.S. Cl. ........................................... 15/314; 15/301
(58) Field of Search .......................... 15/314, 315, 301, 15/327.6, 353

(56) References Cited

U.S. PATENT DOCUMENTS

| | | | |
|---|---|---|---|
| 1,942,358 A | 1/1934 | Grathwol | 15/313 |
| 3,023,447 A | 3/1962 | Senne | 15/314 |
| 4,336,427 A * | 6/1982 | Lindsay | 15/314 |
| 4,591,368 A | 5/1986 | MacDuff | 15/314 |
| 4,708,370 A | 11/1987 | Todd | 285/12 |
| 4,938,309 A | 7/1990 | Emdy | 15/314 |
| 4,964,189 A * | 10/1990 | Rau et al. | 15/327.6 |
| 5,408,722 A * | 4/1995 | Berfield | 15/327.6 |
| 5,692,542 A | 12/1997 | Smith | 15/314 |
| 5,737,797 A | 4/1998 | Rittmueller et al. | 15/314 |
| 5,784,750 A | 7/1998 | Sankovic et al. | 285/7 |
| 5,813,085 A | 9/1998 | Fritz et al. | 15/314 |
| 6,052,863 A | 4/2000 | Rittmueller et al. | 15/726 |

FOREIGN PATENT DOCUMENTS

AU 26823/71 3/1971

* cited by examiner

Primary Examiner—Theresa T. Snider
(74) Attorney, Agent, or Firm—Pearne & Gordon LLP

(57) ABSTRACT

A system for adapting the intake configuration of a central vacuum cleaning system is disclosed. The canister of the central vacuum cleaning system is provided with at least two vacuum intake openings from which an installer can choose to insert an intake coupler and at least one intake closure or cap of the present invention. Insertion and attachment of the intake coupler and the cap(s) is achieved by use of a novel twist-to-lock interface provided between the vacuum intake openings and the coupler and cap(s). Attachment of the coupler and the cap(s) is accomplished easily and quickly by hand and without the need for glue, clamps, tools, or any other equipment.

28 Claims, 8 Drawing Sheets

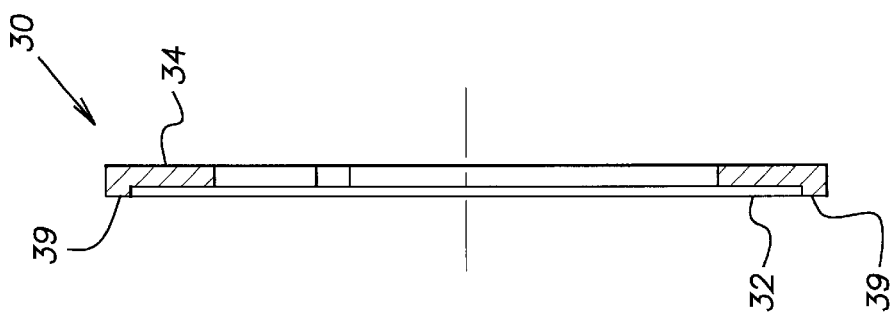
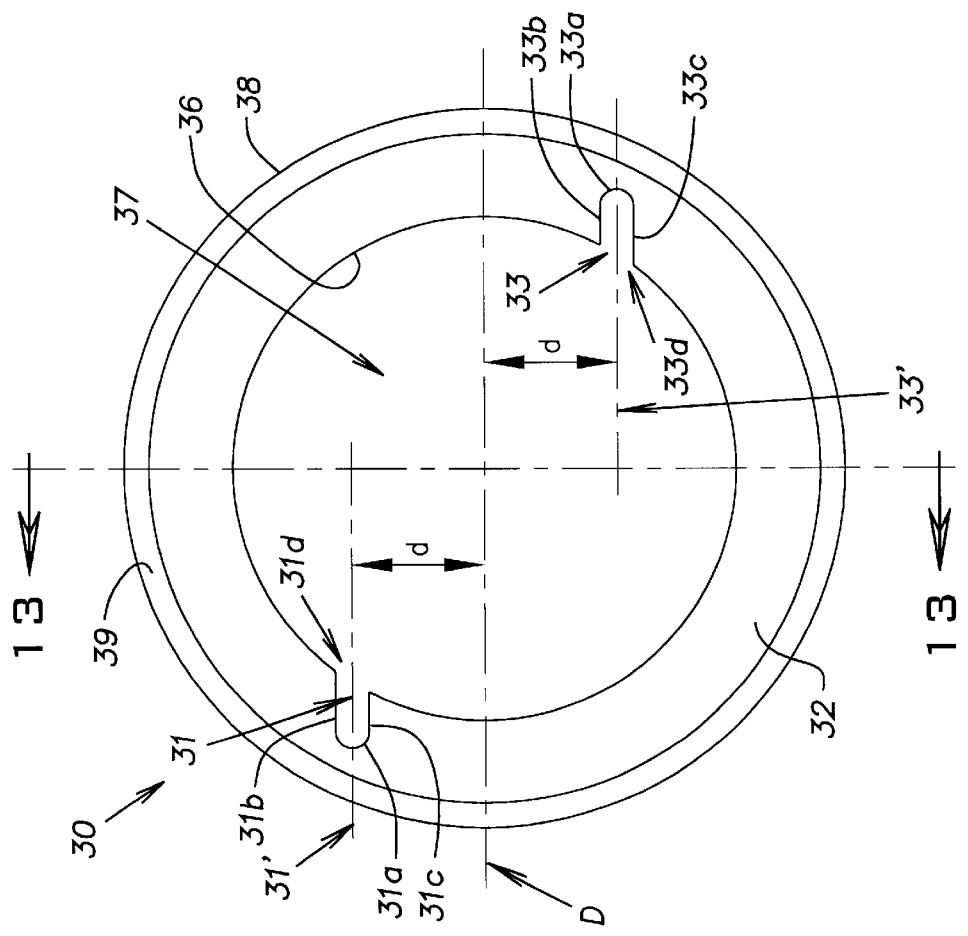

INTAKE SYSTEM FOR CENTRAL VACUUM CLEANER

FIELD OF THE INVENTION

The present invention relates generally to a central vacuum cleaner apparatus, and more particularly, to an adaptable twist lock intake system for use with a canister commonly included in a built-in vacuum cleaner frequently found in a building such as a house and useful for vacuuming floors, carpets, drapes, upholstery, etc. in the house.

BACKGROUND OF THE INVENTION

A first known type of central vacuum cleaning apparatus traditionally has one main vacuum (suction) intake on one side of the canister unit and a utility vacuum (suction) intake on the front of the canister unit. The main suction intake is used for connecting the network of piping in the house to the canister unit, and the utility suction intake is used when the homeowner wants to use the vacuum in a location that is relatively close to the canister unit. Typically, only one of these intakes is used at a time.

A second type of central vacuum cleaning apparatus has a dual intake configuration, wherein two vacuum (suction) intakes are located on diametrically opposite of each other on the wall of the canister unit. When one of these two vacuum intakes is used for connecting the piping network in the house, the other is either capped off or utilized as a utility vacuum intake with the result that only one of the suction intakes is used at a time.

In view of the foregoing, it is desirable for an installer of a central vacuum cleaning apparatus to have an option to use a main vacuum intake located on either the left or the right side of the canister unit and to be able to utilize a simple intake coupling assembly. Additionally, it is further desirable for the homeowner to have a cleaning apparatus provided with a usable front-located utility vacuum intake.

SUMMARY OF THE INVENTION

The present invention is an improved system for adapting the intake configuration of a central vacuum cleaning system. The present invention provides not only a custom vacuum intake connection arrangement for an installer, but also the convenience of a front-located utility vacuum intake for a homeowner. In general, the canister of the central vacuum cleaning system of the present invention is provided with at least two vacuum intake openings from which the installer can choose, depending upon which is in the most convenient location. The installer attaches the intake coupler of the present invention at the selected intake opening and a cap of the present invention at the non-selected opening(s) to close or cap them off.

Attachment of the intake coupler and cap of the present invention is achieved by use of a novel "twist-to-lock" interface between the canister unit openings and the coupler and cap. The intake coupler of the present invention comprises a unitary tube having a central flange with two locking tabs. The intake openings of the canister are circular holes with notches that are complementary to the locking tabs. Installation of the intake coupler into the intake opening is accomplished without the need for glue, clamps, tools or any other equipment by inserting the coupler into the desired intake opening so that the flange meets the canister wall surrounding the opening. A gasket is positioned within the interface to provide an adequate seal. Partial rotation of the intake coupler relative to the canister wall causes the tabs to engage their respective intake opening notches.

The cap of the present invention is constructed and arranged similarly to the intake coupler. The cap is provided with the same basic flange, tabs and gasket; however, when it is installed, the body of the cap extends mostly into the interior of the canister unit from the flange. The cap is provided with a diametrical wall to permit hand rotation at its external end.

Accordingly, it is an aspect of the present invention to provide a means for an installer of a central vacuum cleaning apparatus to have an option to use a main vacuum intake located on either side of the canister unit for connecting the apparatus to the vacuum piping network installed in the house.

It is another aspect of the present invention not only to provide a means for an installer of a central vacuum cleaning apparatus to have an option to use a main vacuum intake located on either side of the canister unit, but also for the homeowner to have a cleaning apparatus provided with a usable front-located utility vacuum intake.

It is yet another aspect of the present invention to provide an intake coupler means having a unitary construction that is simpler and less costly to manufacture and install than conventional, multi-piece coupler means.

It is a further aspect of the present invention to provide an intake coupler means that requires the use of no installation paraphernalia and no extra pipe pieces.

It is yet another aspect of the present invention to provide an intake closure means that, along with the intake coupler means of the present invention, can be readily installed, removed and relocated to any other intake opening of the canister unit at any time during the lifetime of the cleaning apparatus.

These and other aspects of the present invention will become evident by reference to the accompanying drawings and detailed description of the invention.

BRIEF DESCRIPTION OF THE DRAWINGS

FIG. 12 is a plan view of a gasket used with the intake coupler shown in FIG. 1 and with the intake closure means shown in FIG. 8;

FIG. 13 is a side cross-sectional view of the gasket shown in FIG. 12 and taken along the line 13—13 therein;

DETAILED DESCRIPTION OF THE INVENTION

Figure 1:
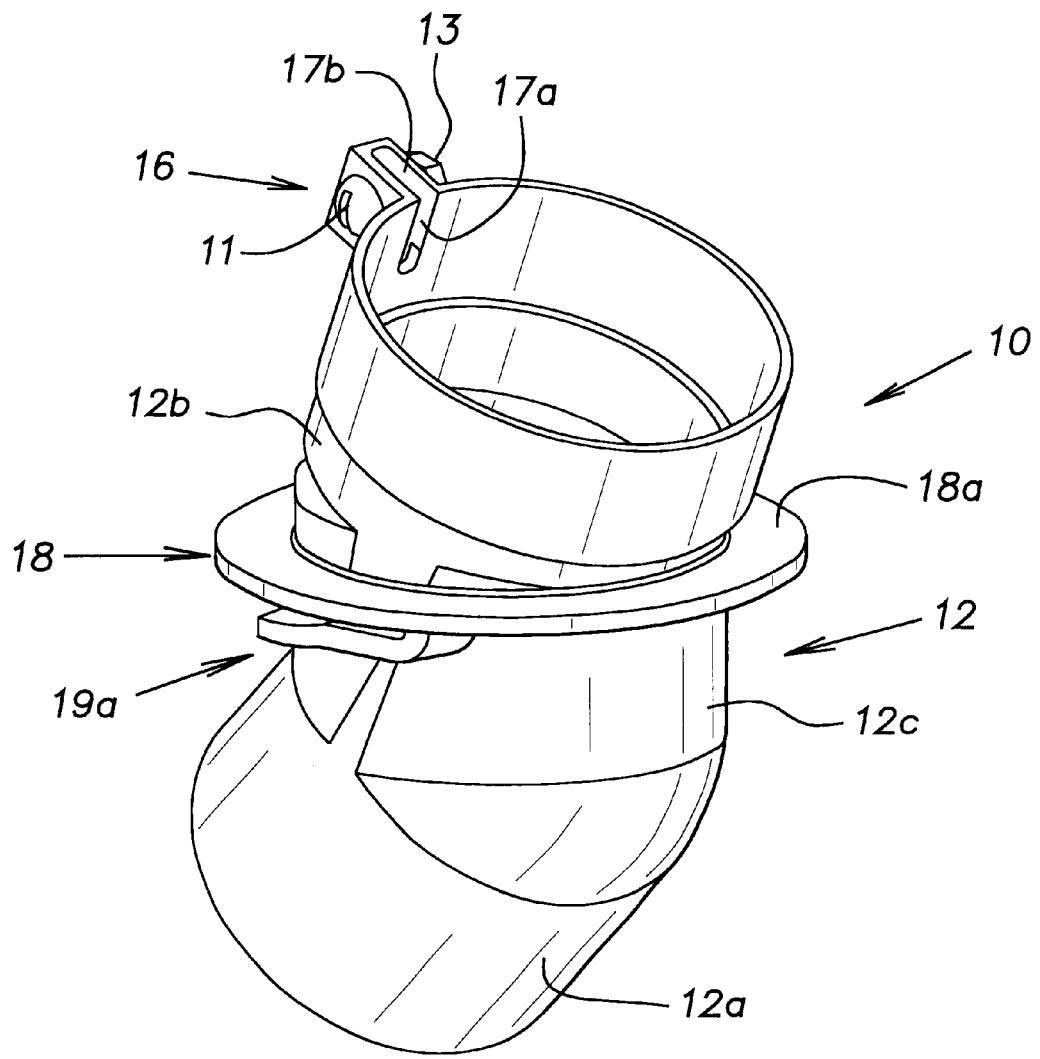
FIG. 1 is a perspective view of an intake coupler of the intake system of the present invention.
Figure 2:
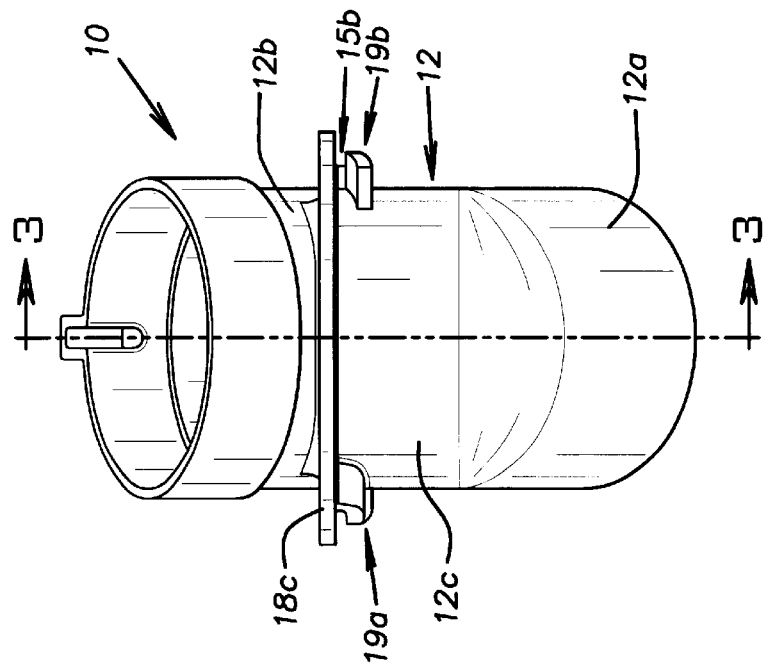
FIG. 2 is a side elevation view of the coupler shown in FIG. 1.
Figure 3:
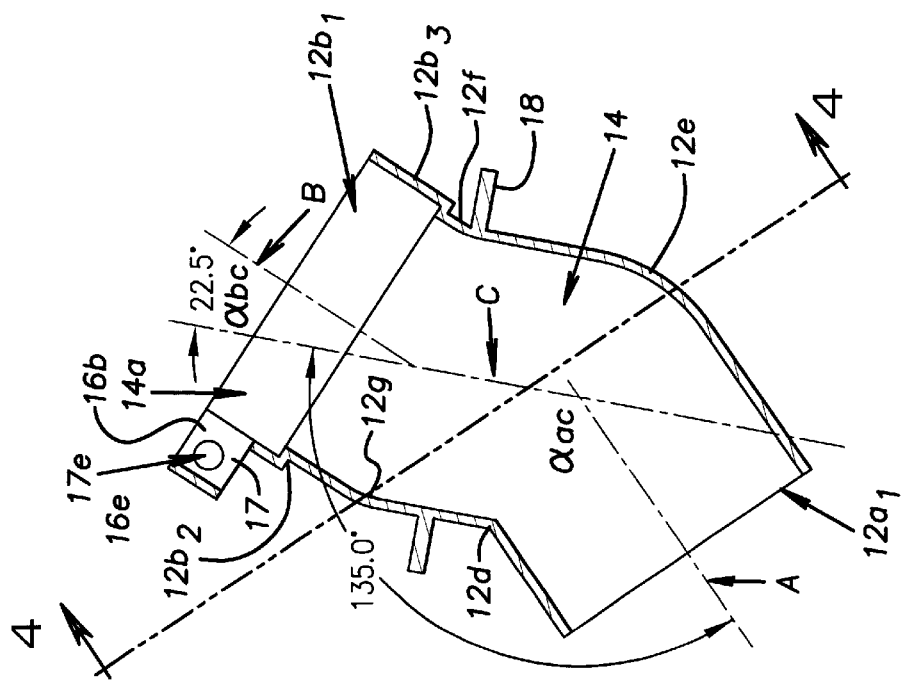
FIG. 3 is a cross-sectional view of the coupler shown in FIG. 1, taken along the line 3—3 shown in FIG. 2.
Figure 4:
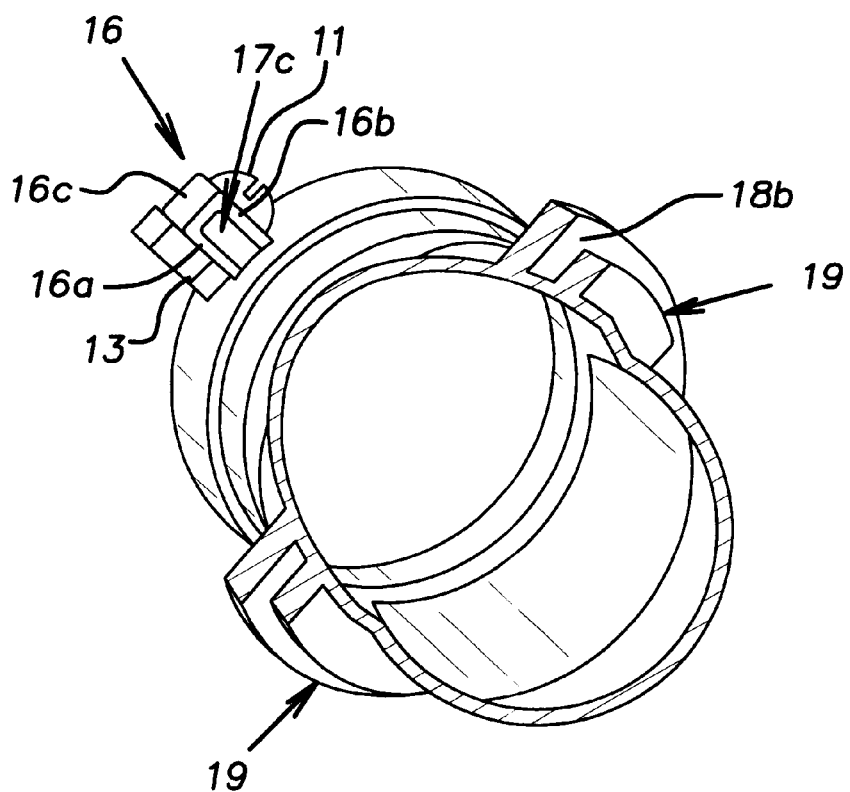
FIG. 4 is a cross-sectional view of the coupler shown in FIG. 1, taken along the line 4—4 shown in 3.
Figure 5:
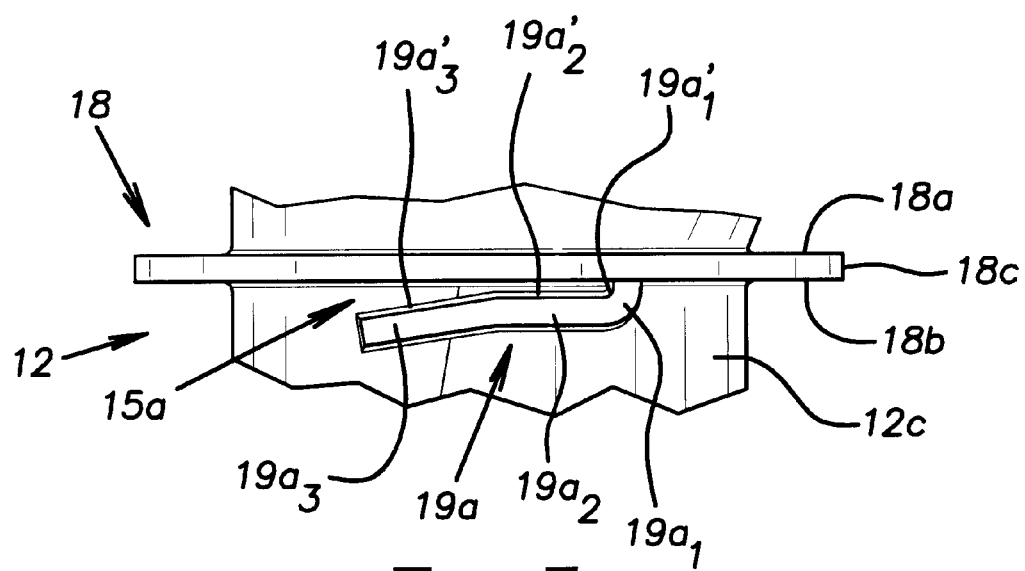
FIG. 5 is a partial side elevation view of the intake coupler shown in FIG. 1, taken in the flange and tab region of the coupler.
Figure 6:
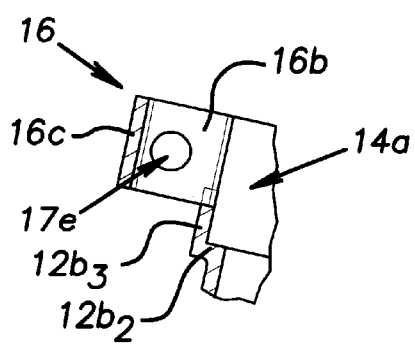
FIG. 6 is side view of a lug provided on the intake coupler shown in FIG. 1.
Figure 7:
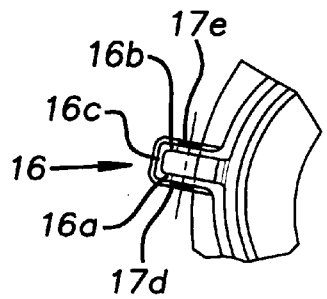
FIG. 7 is an end view of the lug shown in FIG. 6.

An intake coupler means 10 included in the intake system of the present invention is shown in FIGS. 1–7. The coupler 10 generally comprises a unitary, conduit-like main body 12 having a first end (outlet) section 12a, a second end (inlet) section 12b and a mid-section 12c that lies between the first and second end sections 12a and 12b. The section 12a has a central, longitudinally extending axis A, the section 12b has a central longitudinally extending axis B, and the section 12c has a central longitudinally extending axis C. As most clearly shown in FIG. 3, the axes A and C intersect at a point lying on a plane oriented perpendicularly to the axes A and C and passing through the first angular bend 12d and the first arcuate bend 12e where the sections 12a and 12c join one another. The axes A and C intersect one another at an obtuse angle $\alpha_{ac}$ that preferably will be 135°. Similarly, the axes B and C intersect at a point lying on a plane oriented perpendicularly to the axes B and C and passing through the second angular bend 12f and the second arcuate bend 12g where the sections 12b and 12c join one another. The axes B and C intersect one another at an acute angle $\alpha_{bc}$ that preferably will be 22.5°.

The sections 12a, 12b and 12c of the body 12 collectively form a winding, inner passageway 14 that extends between a first circular opening 12a, defined by the first end section 12a of the main body 12 and a second circular opening 12b, defined by the second end section 12b of the main body 12. The diameter of the passageway 14 at the second circular opening 12b, is marginally larger than the diameter at the first circular opening $12a_1$. This is the case because the second end section 12b of the body 12 includes a radially extending flange portion $12b_2$ and an axially extending sleeve portion $12b_3$ that cooperatively define a widened neck region 14a of the passageway 14.

A lug 16 projects radially outward from and axially along the sleeve portion $12b_3$ of the second end section 12b. As indicated by FIGS. 2, 3, 6 and 7, the lug 16 comprises a first side wall 16a, a second side wall 16b, and an outer wall 16c. The first and second side walls 16a and 16b are parallel to one another and extend radially away from and axially along the outer surface of the portion $12b_3$. The outer wall 16c, which is spaced radially away from and extends axially parallel relative to the portion $12b_3$, is joined at its opposing axially extending edges to the radially outermost ends of the first and second side walls 16a and 16b. The inner faces of the first side wall 16a, the second side wall 16b, and the outer wall 16c form a channel 17. The channel 17 openly communicates at first opening 17a with the neck region 14a of the passageway 14, at second opening 17b with the second circular opening 12b, and at third opening 17c with the region exterior to the axially extending sleeve portion $12b_3$ of the second end (inlet) section 12b. The channel 17 is also provided with first and second orifices 17d and 17e that respectively extend through the first and second side walls 16a and 16b of the lug 16. A bolt 11 extends through the orifices 17d and 17e. A nut 13 secures the bolt 11. The nut 13 and bolt 11 are used to adjust the circumference of the axially extending sleeve portion $12b_3$ of the second end (inlet) section 12b for clamping the intake coupler 10 to a clamping flange of a vacuum piping network.

The mid-section 12c of the coupler 10 includes a flange 18 and a pair of flange tabs 19. The flange 18 is integrally joined at its radially innermost curved edge to the outer surface of the mid-section 12c and has a first annular face 18a, a second annular face 18b and a radially outer curved edge 18c. The first annular face 18a is generally oriented toward the inlet end of the coupler 10, and the second annular face 18b, which is parallel to the face 18a, is oppositely oriented toward the outlet end of the coupler 10.

The pair of flange tabs 19 includes a first flange tab 19a and a second flange tab 19b. The flange tabs 19a and 19b are integrated transversely with the flange 18 at the second annular face 18b and circumferentially with the mid-section 12c at the outer surface thereof. The flange tabs 19a and 19b are positioned on the second annular face 18b and the outer face of the mid-section 12c so that they are diametrically opposite one another. The flange tabs 19a and 19b are structurally identical in all respects; therefore, a description of the structure of only one of them, the flange tab 19a, will be provided here, and it will be recognized that whatever structural description is provided for the tab 19a will be equally applicable to the other tab 19b.

The flange tab 19a is comprised of three integrated segments: an arcuate first end segment $19a_1$, a straight middle segment $19a_2$ and a straight second end segment $19a_3$. The arcuate first end segment 19a, serves, among other things, as a means to join the tab 19a to the flange 18. The straight middle segment $19a_2$ extends in a plane that is perpendicular to the central longitudinal axis C of the mid-section 12c of the main body 12. The second end segment $19a_3$ adjoins the straight middle segment $19a_2$ and is angled away from the second annular face 18b of the flange 18 and toward the straight middle segment $19a_2$ of the tab 19a. The second annular face 18b of the flange 18, the outer surface of the mid-section 12c and the surfaces $19a_1'$, $19a_2'$ and $19a_3'$ of the tab 19a cooperate to define a circumferentially extending slot 15a between the flange 18 and the tab 19a. The purpose of the circumferentially extending slot 15a along with a corresponding slot 15b formed between the flange 18 and the tab 19b will be explained later.

An intake closure means 20 included in the intake system of the present invention is shown in FIGS. 8–11. The intake closure means 20 is a stopper-like structure molded from a plastic substance and having a substantially radially extending, disc-like base portion 22, a substantially axially extending, cylindrical main body portion 24 and a substantially radially extending, annular flange portion 26. The closure means 20 also has a radially and axially extending partition portion 28 that, along with the disc-like base portion 22 and the cylindrical main body 24, defines a pair of recesses 27 and 29 that are situated on opposite sides of the partition 28 and are dimensionally the same in all respects. The partition portion 28 allows for hand grasping and manipulating the closure means 20 in a manner as will be hereinafter discussed.

The intake closure means 20 also has a pair of closure means flange portion tabs 23 that are diametrically located relative to each other. The pair of closure means flange portion tabs includes a closure means flange portion first tab 23a and a closure means flange portion second tab 23b. The first and second tabs 23a and 23b are structurally and dimensionally the same as the flange tabs 19a and 19b provided on the intake coupler means 12. The tabs 23a and 23b are integrated transversely with the flange 26 at an annular face 26a that is oriented toward the base portion 22 of the closure means 20. The tabs 23a and 23b are also integrated circumferentially with the cylindrical main body portion 24 at the outer surface thereof. In a manner not unlike that described above in connection with the tabs 19a and 19b, the tabs 23a and 23b, the flange 26 and main body portion 24 cooperatively define a pair of circumferentially extending slots 25a and 25b. The slots 25a and 25b have the same purpose as the slots 15a and 15b provided on the intake coupler means 12, which purpose will be hereinafter explained. Projections 21 project from the base portion 22 to form opposed and offset engagement surfaces 21a. The projections 21 can be, for example, molded as a part of the closure 20 in an A-shaped configuration. The engagement surfaces 21a are arranged so that a lever, such as a wrench or screwdriver can be inserted between the surfaces. A force can then be applied to the lever to rotate the intake closure 20 to facilitate installation and removal.

FIGS. 12 and 13 show a gasket 30 included with the intake system of the present invention. The gasket 30 is made of a resilient solid substance such as Santoprene® rubber, or any other substance having suitably similar properties. The gasket 30 is used with the intake coupler means 10 and with the intake closure means 20 in a way that will hereinafter be explained. The gasket 30 is comprised of a pair of first and second axially disposed, parallel faces 32 and 34 and a pair of first and second radially disposed, concentric edges 36 and 38. The first edge 38 has a diameter that is greater than the diameter of the radially curved outer edge 18c of the flange 18 of the coupler means 10 and the diameter of the radially curved outer edge 26a of the flange 26 of the closure means 20. Adjacent the first edge 38, the gasket is thicker to form an axial flange 39. The diameter of the second edge 36 of the gasket 30 is smaller than the diameter of the radially curved outer edge 18c of the flange 18 of the coupler means 10 and the diameter of the radially curved outer edge 26b of the flange 26 of the closure means 20. The second edge 36 defines a central void 37 in the gasket 30. The edge 36 further defines a pair of first and second notches 31 and 33. The notches 31 and 33 have longitudinally extending central axes 31' and 33' that are equidistantly offset by a distance "d" relative to a transverse axis D that extends through the center of the gasket 30. The notches 31 and 33 are shaped to have arcuate first ends 31a and 33a, straight parallel sides 31b and 31c and 33b and 33c, and open second ends 31d and 33d. The notches 31 and 33 are configured to permit the gasket 30 to be applied to the coupler means 10 and the closure means 20 in a manner that will now be described.

In the case of the coupler means 10, the central void 37 receives the first end (outlet) section 12a of the conduit-like main body 12. The flange 39 of the gasket 30 faces away from the flange 18 of the coupler 10. The edge 36 is then slid axially along the outer surface of the first end (outlet) section 12a and thereafter along the outer surface of the mid section 12c of the conduit-like main body 12 until the gasket 30 abuts the first flange tab 19a and the second flange tab 19b. The gasket 30 is then gently stretched in the radial direction over the tabs 19a and 19b and, if necessary, rotated clockwise or counter-clockwise so that the notches 31 and 33 receive first curved end segments of the tabs 19a and 19b and either of the axially disposed, parallel faces 32 and 34 contacts the second annular face 18b of the flange 18.

In the case of the closure means 20, the central void 37 receives the disc-like base portion 22 and the cylindrical main body portion 24 of the closure means 20. The edge 36 is then slid axially along the outer surface of the main body portion 24 until the gasket abuts the first flange tab 23a and the second flange tab 23b. The gasket 30 is then gently stretched in the radial direction over the tabs 23a and 23b and, if necessary, rotated clockwise or counter-clockwise so that the notches 31 and 33 receive first curved end segments of the tabs 23a and 23b and either of the axially disposed, parallel faces 32 and 34 contacts the second annular face 23c of the flange 18. With the gasket 30 assembled to the coupler means 10 and the closure means 20 in the manner just described, the coupler means 10 and the closure means 20 are ready for use with the canister unit 40.

Figure 14:
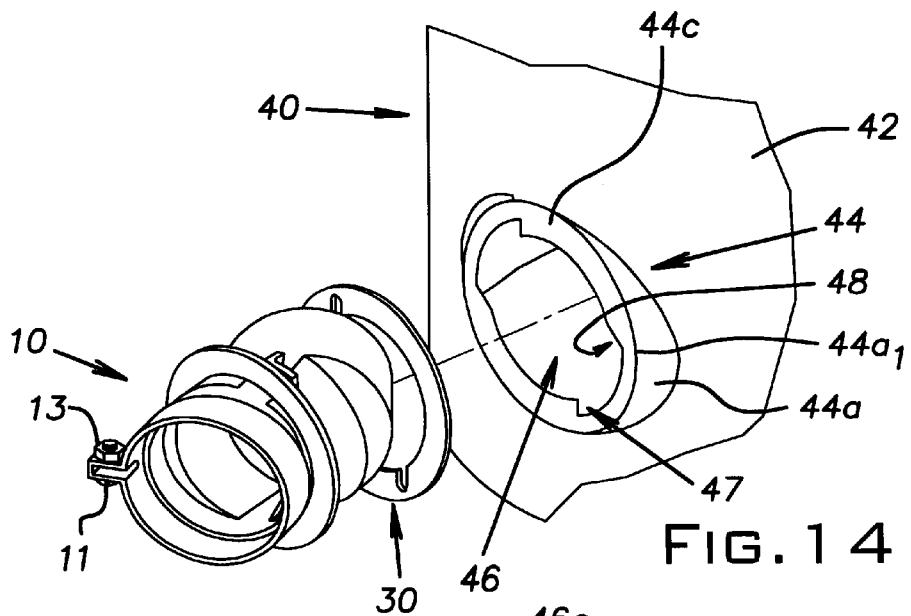
FIG. 14 shows an exploded perspective view of the coupler shown in FIG. 1 and the gasket shown in FIG. 12 relative to a wall portion of a canister of a central vacuum cleaning apparatus, that defines a canister intake opening used with the intake system of the present invention.
Figure 15:
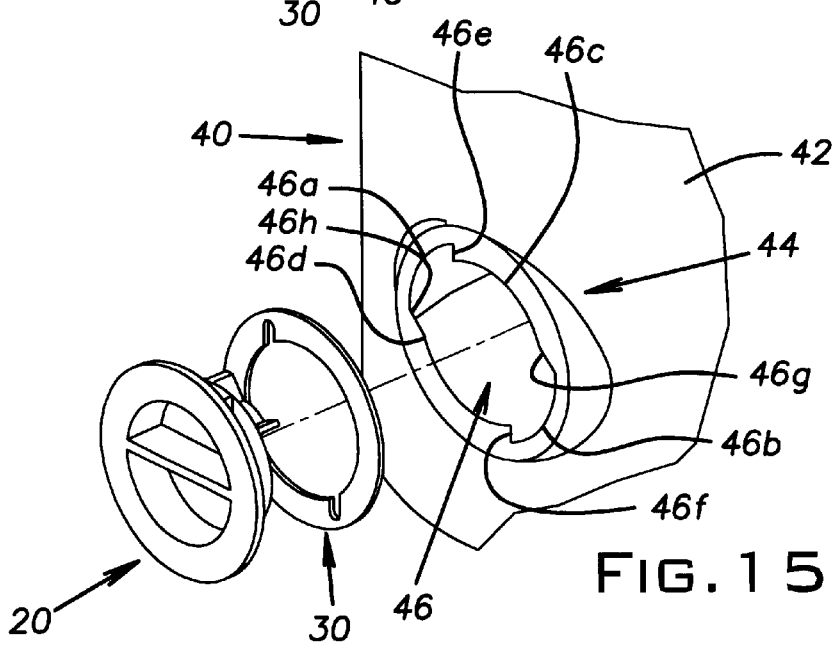
FIG. 15 shows an exploded perspective view of the closure shown in FIG. 8 and the gasket shown in FIG. 12 relative to another wall portion of the canister shown in FIG. 14, that defines a canister intake opening similar to that shown in FIG. 12 and that is also used with the intake system of the present invention.
Figure 8:
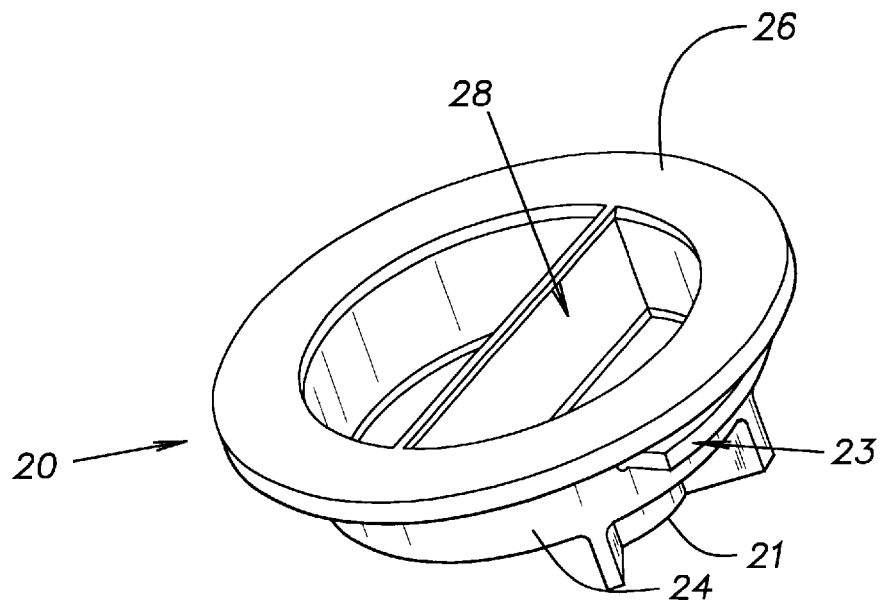
FIG. 8 is a perspective view of an intake closure of the intake system of the present invention.
Figure 9:
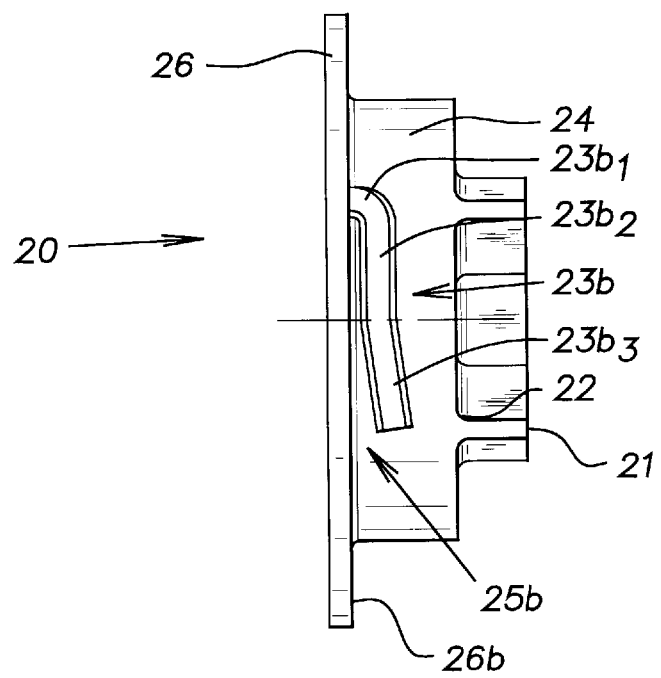
FIG. 9 is a side elevation view of the intake closure shown in FIG. 8.
Figure 11:
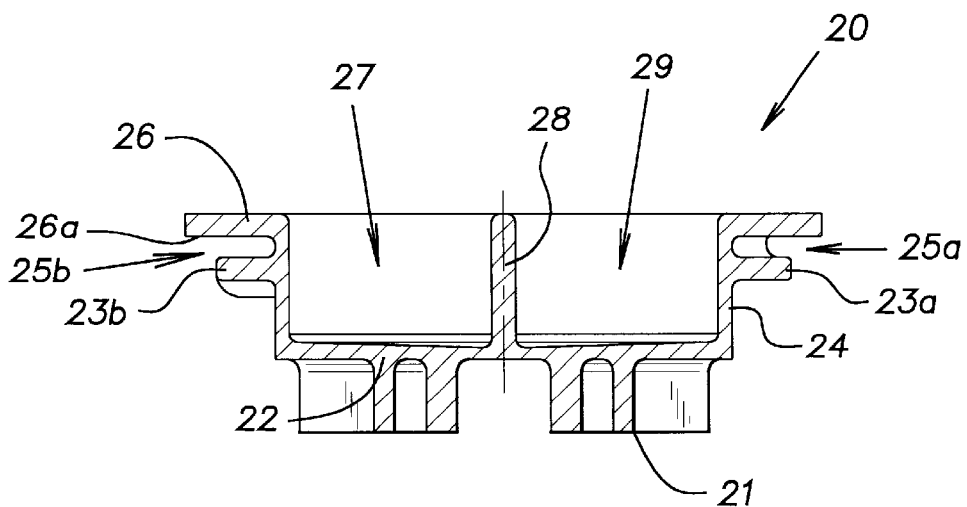
FIG. 11 is a side cross-sectional view of the intake closure shown in FIG. 8, taken along the line 11—11 shown in FIG. 10.
Figure 10:
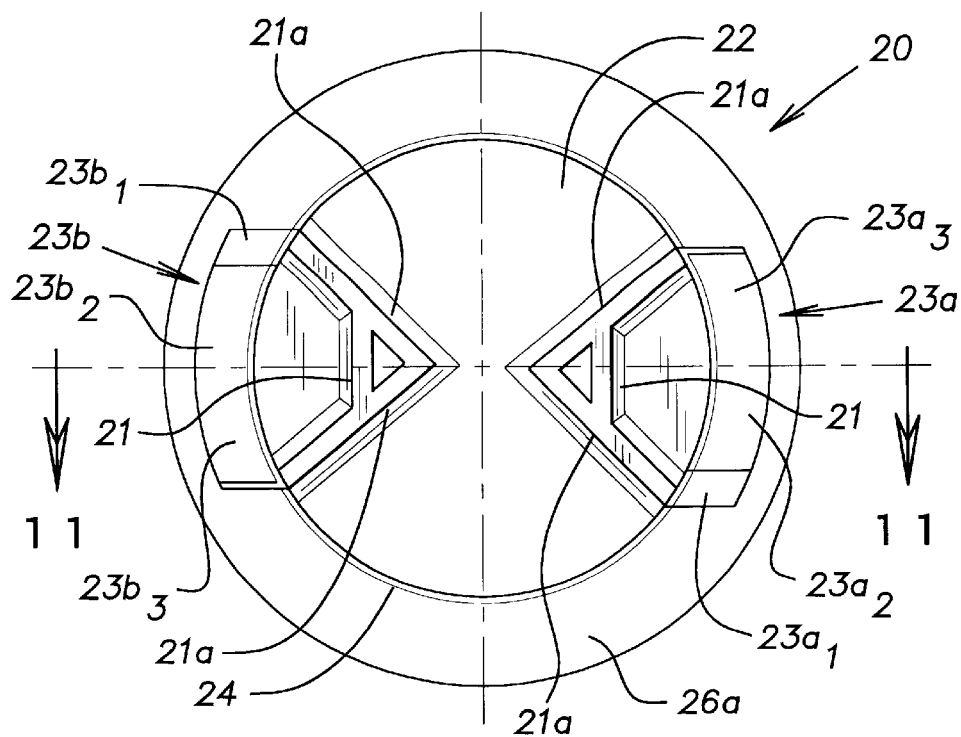
FIG. 10 is a bottom view of the intake closure shown in FIG. 8.
Figure 16:
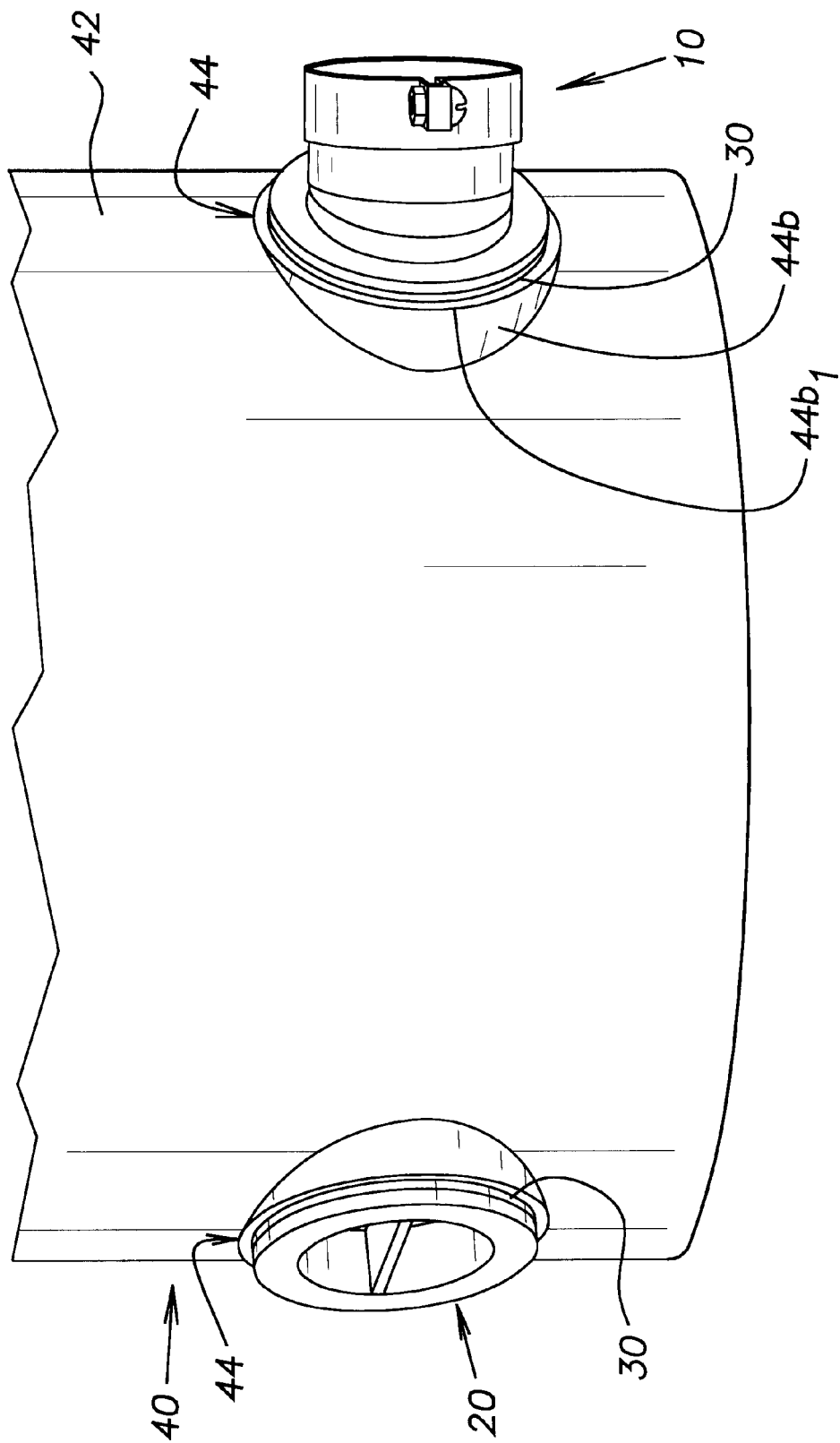
FIG. 16 shows a side elevation view of a portion of a canister of a central vacuum cleaning apparatus, having the intake coupler shown in FIG. 1 and the intake closure means shown in FIG. 8 installed in intake openings provided in the canister wall.

FIGS. 14 and 15 show a portion of a cylindrical, preferably metal, canister unit 40 that is adapted for use with the intake system of the present invention. The portion of the canister unit 40 includes a canister wall segment 42 and a portal structure 44. The portal structure 44 is preferably formed in the wall segment 42 by a known stamping process. The portal structure 44 projects radially outward from the wall 42 and defines a canister intake opening 46 of the present invention. The portal structure 44 comprises a first gusset-like portion 44a, a second gusset-like portion 44b and a ring-like plate portion 44c. The curved edges 44a, and 44b, of the first and second gusset-like portions 44a and 44b lay in a plane that is tangent to the wall 42 at the canister intake opening 46 and cooperate with adjoining portions of the canister wall 42 to define the periphery of the ring-like plate portion 44c.

The canister intake opening 46 includes a flange shaped to receive and co-act equally well with either the first and second flange tabs 19a and 19b included on the flange 18 of the mid-section 12c of the intake coupler means 10 or the first and second tabs 23a and 23b included on the annular flange portion 26 of the closure means 20 to form a mounting structure for mounting the intake coupler to the suction intake. The canister intake opening 46 is defined by the first and second arcuate edges 46a and 46b, by the third and fourth arcuate edges 46c and 46d, by the first and second straight edges 46e and 46f, and by the third and fourth edges 46g and 46h. The first and second straight edges 46e and 46f respectively join terminal points of the first and third arcuate edges 46a and 46c and of the second and fourth arcuate edges 46b and 46d to form the sharp notches 47, and the third and fourth edges 46g and 46h respectively join terminal points of the second and third arcuate edges 46b and 46c and of the first and fourth arcuate edges 46a and 46d to form the blunt notches 48. The tabs 19a and 19b or 23a and 23b are received by the opening 46 so that either the annular face 18b of the flange 18 of the coupler 10 or the annular face of the flange 26 of the closure means 20 abuts the ring-like plate portion 44c of the portal 44 and either the free end of the straight second end segment $19a_3$ of the tab 19a (or segment $19b_3$ of the tab 19b) or the comparable free end of the straight end segment of the tab 23a (or the tab 23b) is received by one of the sharp notches 47, i.e., the free end of the tabs 19 or 23 is spaced arcuately counter-clockwise relative to and axially inward from either the first straight edge 46e or the second straight edge 46f of the opening 46. With the free end of the tabs 19a and 19b or 23a and 23b received in the manner just described, the coupler means 10 or the closure means 20, along with the gasket 30 assembled thereto in the manner explained hereinabove, can simply and expeditiously be rotated clockwise by hand in the opening 46 until the arcuate first end segment $19a_1$ of the tab 19a (or segment $19b_1$ of the tab 19b) abuts one or the other of the straight edges 46e or 46f or until the comparable arcuate first end segment of the tab 23a (or the tab 23b) similarly abuts one or the other of the straight edges 46e or 46f. Once the coupler means 10 or the closure means 20 has been rotated in the opening 46 in the described manner, portions of plate 44c that define the third and fourth edges 46c and 46d of the opening 46 are received in the circumferentially extending slots 15a and 15b of the coupler means 10 or in the comparable circumferentially extending slots of the closure means 20 with the gasket 30 being situated between the inside face of the plate 44c and the tabs 19a and 19b or 23a and 23b. The portions of plate 44c that define the third and fourth edges 46c and 46d of the opening 46 preferably are gently indented gently inward toward the center of canister unit 40. Inward indentation of the third and fourth edges 46c and 46d causes the flange 18 and of the coupler means 10 or the flange 23 of the closure means 20 to be drawn slightly inward as either of them is rotated in the opening 46 which in turn causes the gasket 30 to be compressed and to thus establish an air-tight seal between the coupler means 10 and the canister unit 40 or between the closure means and the canister unit 40 and to thus restrict axial movement of the coupler means 10 or the closure means 20 relative to the ring-like plate 44c.

In view of the foregoing, it should be evident that the intake coupling system of the present invention makes it possible for an installer to select one or the other of the two portal structures 44 for receiving the intake coupler 10 based on which of the structures 44 is most convenient for making a connection with an end of the vacuum piping network installed in the house and to effectively seal off the non-selected portal structure 44 with the closure means 20. It should further be evident that the intake coupling system of the present invention makes it possible for the intake coupler means 10 and the closure means 20 to be installed into and removed from the portal structures 44 simply by twisting them by hand and without the need for any tools or application of sealant substances such a glue or cement.

Although a detailed description of a preferred embodiment of this invention has been shown and described hereinabove, it will be understood that various modifications and rearrangements of the parts and their respective features may be resorted to without departing from the scope of the invention as disclosed and claimed herein.

What is claimed is:

1. An intake system for a central vacuum cleaner for use in a building, said intake system comprising: a canister unit having a canister unit wall and a first suction intake and a second suction intake provided in said canister unit wall; a suction intake coupler received alternatively by said first suction intake and said second suction intake; a vacuum piping network installed in said building and connected to said suction intake coupler; a suction intake closure alternatively receivable by said first suction intake and said second suction intake; and a resilient seal applied to said suction intake coupler and to said suction intake closure to provide an air-tight seal between said suction intake coupler and said canister unit wall and between said suction intake closure and said canister unit wall.

2. An intake system according to claim 1, wherein said suction intake coupler comprises a unitary, conduit-like main body having a first end section, a second end section and a mid-section that connects said first end section and said second end section.

3. An intake system for a central vacuum cleaner for use in a building, said intake system comprising: a canister unit having a canister unit wall and a first suction intake and a second suction intake provided in said canister unit wall; a suction intake coupler received by said first suction intake; a vacuum piping network installed in said building and connected to said suction coupler intake; a suction intake closure receivable by said second suction intake; and a resilient seal applied to said suction intake coupler and to said suction intake closure to provide an air-tight seal between said suction intake coupler and said canister unit wall and between said suction intake closure and said canister unit wall;

wherein said first suction intake is a first portal structure and said second suction intake is a second portal structure, said first portal structure and said second portal structure each comprising a first gusset-like portion, a second gusset-like portion and a ring-like plate portion, said first gusset-like portion and said second gusset-like portion projecting outwardly from said canister unit wall and said ring-like plate portion laying in a plane that is tangent to said canister unit wall at a canister intake opening provided in said canister unit wall.

4. The take system according to claim 3, wherein said canister intake opening is defined by a first arcuate edge, a second arcuate edge, a third arcuate edge, a fourth arcuate edge, a first straight edge, a second straight edge, a third straight edge and a fourth straight edge of said ring-like plate portion.

5. The intake system according to claim 4, wherein said first arcuate edge and said second arcuate edge are congruent with each other but not with said third arcuate edge and said fourth arcuate edge; said third arcuate edge and said fourth arcuate edge are congruent with each other but not with said first arcuate edge and said second arcuate edge; said first straight edge and said second straight edge are congruent with each other but not with said third straight edge and said fourth straight edge; and said third straight edge and said fourth straight edge are congruent with each other but not with said first straight edge and said second straight edge.

6. The intake system according to claim 4, wherein said first straight edge connects a first terminal point of said first arcuate edge and a first terminal point of said third arcuate edge; said second straight edge connects a first terminal point of said second arcuate edge and a first terminal point of said fourth arcuate edge; said third straight edge connects a second terminal point of said second arcuate edge and a second terminal point of said third arcuate edge; and said fourth straight edge connects a second terminal point of said first arcuate edge and a second terminal point of said fourth arcuate edge.

7. The intake system according to claim 6, wherein said first straight edge and said first arcuate edge define a first notch in said canister intake opening; said second straight edge and said second arcuate edge define a second notch in said canister intake opening; said third straight edge and said second arcuate edge define a third notch in said canister intake opening; and said fourth straight edge and said first arcuate edge define a fourth notch in said canister intake opening.

8. An intake system for a central vacuum cleaner for use in a building, said intake system comprising: a canister unit having a canister unit wall and a first suction intake and a second suction intake provided in said canister unit wall; a suction intake coupler received by said first suction intake; a vacuum piping network installed in said building and connected to said suction coupler intake; a suction intake closure receivable by said second suction intake; and a resilient seal applied to said suction intake coupler and to said suction intake closure to provide an air-tight seal between said suction intake coupler and said canister unit wall and between said suction intake closure and said canister unit wall;

wherein said suction intake coupler comprises a unitary, conduit-like main body having a first end section, a second end section and a mid-section that connects said first end section and said second end section; and wherein said first end section, said mid-section and said second end section of said main body collectively form a winding, inner passageway extending between a first opening defined by said first end section of said main body and a second opening defined by said second end section of said main body.

9. The intake system according to claim 8, wherein said second end section includes a flange portion and a sleeve portion, said flange portion and said sleeve portion cooperatively defining a widened neck region in said winding, inner passageway, said widened neck region including said second opening defined by said second end section of said main body and providing a means to connect said suction intake coupler to said vacuum piping network.

10. The intake system according to claim 9 wherein said second end section includes a lug projecting outwardly from and along said sleeve portion, said lug comprising a first side wall, a second side wall, and an outer wall, said first side wall, said second side wall, and said end wall forming a channel, said channel openly communicating with said widened neck region in said winding inner passageway.

11. The intake system according to claim 10, wherein said first side wall of said lug has a first side wall orifice and said second side wall of said lug has a second side wall orifice.

12. An intake system for a central vacuum cleaner for use in a building, said intake system comprising: a canister unit having a canister unit wall and a first suction intake and a second suction intake provided in said canister unit wall; a suction intake coupler received by said first suction intake; a vacuum piping network installed in said building and connected to said suction coupler intake; a suction intake closure receivable by said second suction intake; and a resilient seal applied to said suction intake coupler and to said suction intake closure to provide an air-tight seal between said suction intake coupler and said canister unit wall and between said suction intake closure and said canister unit wall;

wherein said suction intake coupler comprises a unitary, conduit-like main body having a first end section, a second end section and a mid-section that connects said first end section and said second end section; and wherein said first end section, has a central, longitudinally extending axis A, said second end section has a central, longitudinally extending axis B, and said mid-section has a central, longitudinally extending axis C, said A and said axis B intersecting said axis C.

13. The intake system according to claim 12, wherein said axis A and said axis C intersect at a first point of intersection on said axis C and form an obtuse angle $\alpha_{ac}$ and said axis B and said axis C intersect at a second point of intersection on said axis C and form an acute angle $\alpha_{bc}$.

14. The intake system according to claim 13, wherein said obtuse angle $\alpha_{ac}$ is approximately 135 degrees and said acute angle $\alpha_{bc}$ is approximately 22.5 degrees.

15. An intake system for a central vacuum cleaner for use in a building, said intake system comprising: a canister unit having a canister unit wall and a first suction intake and a second suction intake provided in said canister unit wall; a suction intake coupler received by said first suction intake; a vacuum piping network installed in said building and connected to said suction coupler intake; a suction intake closure receivable by said second suction intake; and a resilient seal applied to said suction intake coupler and to said suction intake closure to provide an air-tight seal between said suction intake coupler and said canister unit wall and between said suction intake closure and said canister unit wall;

wherein said suction intake coupler comprises a unitary, conduit-like main body having a first end section, a second end section and a mid-section that connects said first end section and said second end section; and wherein said first end section is an outlet section and said second end section end is an inlet section.

16. An intake system for a central vacuum cleaner for use in a building, said intake system comprising: a canister unit having a canister unit wall and a first suction intake and a second suction intake provided in said canister unit wall; a suction intake coupler received by said first suction intake; a vacuum piping network installed in said building and connected to said suction coupler intake; a suction intake closure receivable by said second suction intake; and a resilient seal applied to said suction intake coupler and to said suction intake closure to provide an air-tight seal between said suction intake coupler and canister unit wall and between said suction intake closure and said canister unit wall;

wherein said suction intake coupler comprises a unitary, conduit-like main body having a first end section, a second end section and a mid-section that connects said first end section and said second end section; and wherein said suction intake coupler includes a flange and a plurality of flange tabs, said flange having a first flange face, a second flange face, a flange outer edge and a flange inner edge at which said flange joins said mid-section, and said plurality of flange tabs has a first end segment, a middle segment and a second end segment, said plurality of flange tabs being joined to said flange and to said mid-section of said conduit-like main body.

17. The intake system according to claim 16, wherein said flange is an annularly shaped flange, said first flange face and said second flange face extend radially outward from said mid-section and are axially spaced apart, said first flange face is oriented toward said second end section of said conduit-like main body, said second flange face being oriented toward said first end section of said conduit-like main body, said plurality of flange tabs being joined at said first end segment to said second flange face of said flange and at an edge defined by said first end segment, said middle segment and said second end segment to an outer face of said mid-section.

18. The intake system according to claim 17, wherein said second flange face, said first end segment, said middle segment, said second end segment of said plurality of flange tabs, and said mid-section define a plurality of slots, said plurality of slots providing a means for connecting said suction intake coupler to said canister unit wall at said first suction intake.

19. The intake system according to claim 16, wherein said first end segment is an arcuately shaped end segment, said middle segment is a straight middle segment, said second end segment is a straight end segment joined at an angle to said straight middle segment.

20. An intake system for a central vacuum cleaner for use in a building, said intake system comprising: a canister unit having a canister unit wall and a first suction intake and a second suction intake provided in said canister unit wall; a suction intake coupler received by said first suction intake; a vacuum piping network installed in said building and connected to said suction coupler intake; a suction intake closure receivable by said second suction intake; and a resilient seal applied to said suction intake coupler and to said suction intake closure to provide an air-tight seal between said suction intake coupler and said canister unit wall and between said suction intake closure and said canister unit wall;

wherein said suction intake closure comprises a base portion, a main body portion connected to said base portion and a flange portion connected to said main body portion.

21. The intake system according to claim 20, wherein said base portion is a substantially radially extending, disc-like base portion, said main body portion is a substantially axially extending, cylindrical main body portion, and said flange portion is a substantially radially extending, annular flange portion.

22. The intake system according to claim 21, wherein said substantially radially extending, cylindrical main body portion includes a radially and axially extending partition portion, said partition portion, along with said disc-like base portion and said cylindrical main body, defining a pair of recesses situated on opposing sides of said partition portion.

23. The intake system according to claim 21, wherein said flange portion has a first flange face, a second flange face, a flange outer edge and a flange inner edge at which said flange joins said main body and said intake closure includes a plurality of closure tabs, said plurality of closure tabs having a first end segment, a middle segment and a second end segment, said plurality of closure tabs being joined to said flange portion and to said cylindrical main body portion of said intake closure.

24. The intake system according to claim 23, wherein said flange portion is an annularly shaped flange, said first flange face and said second flange face extend radially outward from a mid-section of said intake closure and are axially spaced apart, said first flange face being oriented toward said disc-like base of said intake closure, said plurality of closure tabs being joined at said first end segment to said first flange face of said flange portion and at an edge defined by said first end segment, said middle segment and said second end segment to an outer face of said cylindrical main body portion.

25. The intake system according to claim 24, wherein said first flange face, said first end segment, said middle segment, said second end segment of said plurality of flange tabs, and said cylindrical main body portion define a plurality of slots, said plurality of slots providing a means for connecting said suction intake closure to said canister unit wall at said second suction intake.

26. The intake system according to claim 23, wherein said first end segment is an arcuately shaped end segment, said middle segment is a straight middle segment, said second end segment is a straight end segment joined at an angle to said straight middle segment.

27. An intake system for a central vacuum cleaner for use in a building, said intake system comprising: a canister unit having a canister unit wall and a first suction intake and a second suction intake provided in said canister unit wall; a suction intake coupler received by said first suction intake; a vacuum piping network installed in said building and connected to said suction coupler intake; a suction intake closure receivable by said second suction intake; and a resilient seal applied to said suction intake coupler and to said suction intake closure to provide an air-tight seal between said suction intake coupler and said canister unit wall and between said suction intake closure and said canister unit wall;

wherein said resilient seal is a gasket, said gasket including a pair of first and second axially disposed, parallel faces and a pair of first and second radially disposed, concentrically arranged edges, said first radially disposed, concentrically arranged edge defining a central void in said gasket and a pair of first and second notches, said notches having longitudinally extending central axes, said central axes being equidistantly offset by a distance "d" relative to a transverse axis "D" extending through the center of said central void.

28. A central vacuum cleaning unit comprising:

a canister unit;

a suction intake in a wall of the canister unit;

an intake coupler;

a mounting structure for mounting the intake coupler to the canister unit at the suction intake, the mounting structure comprising a first flange extending from one of the intake and the coupler, the first flange having first and second faces, at least one arcuate edge, and at least one straight edge intersecting the arcuate edge transverse to the arcuate edge at the intersection; and a second flange associated with the other of the intake and the coupler, the second flange having a face for engaging the first face of the first flange and at least one tab for engaging the second face of the first flange adjacent the straight edge.

* * * * *

UNITED STATES PATENT AND TRADEMARK OFFICE
CERTIFICATE OF CORRECTION

PATENT NO. : 6,698,059 B2
DATED : March 2, 2004
INVENTOR(S) : Biere et al.

It is certified that error appears in the above-identified patent and that said Letters Patent is hereby corrected as shown below:

Column 3,
Line 46, please delete "12$a$," and insert therefor -- 12$a_1$ --.
Lines 47 and 50, please delete "12$b$," and insert therefor -- 12$b_1$ --.

Column 4,
Line 4, please delete "12$b$," and insert therefor -- 12$b_1$ --.
Line 40, please delete "19$a$," and insert therefor -- 19$a_1$ --.

Column 6,
Line 33, please delete "44$a$," and insert therefor -- 44$a_1$ --.
Line 34, please delete "44$b$," and insert therefor -- 44$b_1$ --.

Column 8,
Line 29, please delete "take" and insert therefor -- intake --.

Column 10,
Line 30, after "and", please insert -- said --.

Signed and Sealed this

Third Day of May, 2005

JON W. DUDAS
*Director of the United States Patent and Trademark Office*